United States Patent
Lacharme et al.

(10) Patent No.: US 9,838,464 B2
(45) Date of Patent: Dec. 5, 2017

(54) REMOTE ACCESS TO CONTENT FROM A THIN CLIENT

(71) Applicant: Orange, Paris (FR)

(72) Inventors: Sandrine Lacharme, Lannion (FR); Maximilien Baumann, Montigny-le-Bretonneux (FR)

(73) Assignee: ORANGE, Paris (FR)

( * ) Notice: Subject to any disclaimer, the term of this patent is extended or adjusted under 35 U.S.C. 154(b) by 180 days.

(21) Appl. No.: 14/423,378

(22) PCT Filed: Aug. 19, 2013

(86) PCT No.: PCT/FR2013/051948
§ 371 (c)(1),
(2) Date: Feb. 23, 2015

(87) PCT Pub. No.: WO2014/029944
PCT Pub. Date: Feb. 27, 2014

(65) Prior Publication Data
US 2015/0229702 A1 Aug. 13, 2015

(30) Foreign Application Priority Data
Aug. 21, 2012 (FR) .................................. 12 57902

(51) Int. Cl.
*G06F 15/16* (2006.01)
*H04L 29/08* (2006.01)
*H04L 29/06* (2006.01)

(52) U.S. Cl.
CPC ........ *H04L 67/10* (2013.01); *H04L 29/08846* (2013.01); *H04L 67/02* (2013.01);
(Continued)

(58) Field of Classification Search
USPC ........................................................ 709/217
See application file for complete search history.

(56) References Cited

U.S. PATENT DOCUMENTS 8,539,054 B2 * 9/2013 Huang ................ H04L 12/2818
370/401
8,937,930 B2 * 1/2015 Sprigg .................. G06F 9/4411
370/338
(Continued)

FOREIGN PATENT DOCUMENTS

EP 2375327 A2 10/2011

OTHER PUBLICATIONS

International Search Report dated Nov. 21, 2013 for corresponding International Application No. PCT/FR2013/051948, filed Aug. 19, 2013.
(Continued)

*Primary Examiner* — Alicia Baturay
(74) *Attorney, Agent, or Firm* — David D. Brush; Westman, Champlin & Koehler, P.A.

(57) ABSTRACT

Remote access is provided to content from a thin client, such as an internet browser, of a communication terminal. A method is provided for accessing at least one piece of content from a thin client of a remote communication terminal, the content being executed by a device for providing access to content on a communication network. The access method includes replication of at least one content replication signal by the thin client. The replication signal that is received by the thin client during a communication session with the content access provider device is produced by an execution module of the content access provider device and relayed unprocessed by a decoy module of the content access provider device. The decoy module is registered with the content access provider device as a virtual replication peripheral.

14 Claims, 4 Drawing Sheets

(52) U.S. Cl.
CPC ............ *H04L 67/08* (2013.01); *H04L 67/142* (2013.01); *H04L 67/2895* (2013.01); *H04L 67/42* (2013.01)

(56) References Cited

U.S. PATENT DOCUMENTS

| | | | |
|---|---|---|---|
| 9,055,139 B1* | 6/2015 | Devireddy | H04L 65/80 |
| 2004/0158620 A1* | 8/2004 | Ha | G05B 15/02 |
| | | | 709/219 |
| 2009/0063966 A1* | 3/2009 | Ennals | G06F 17/3089 |
| | | | 715/277 |
| 2009/0235342 A1 | 9/2009 | Manion et al. | |
| 2010/0281107 A1 | 11/2010 | Fallows et al. | |
| 2011/0145694 A1 | 6/2011 | Graves et al. | |
| 2012/0158984 A1 | 6/2012 | Maitre et al. | |

OTHER PUBLICATIONS

Anantharaman Narayana Iyer et al., "Extending Android Application Programming Framework for Seamless Cloud Integration", Mobile Services (MS), 2012 IEEE First International Conference on, IEEE, Jun. 24, 2012 (Jun. 24, 2012), pp. 96-104, XP032220514.

Christian Willems et al., "A Distributed Virtual Laboratory Architecture for Cybersecurity Training", Internet Technology and Secured Transactions (ICITST), 2011 International Conference for, IEEE, Dec. 11, 2011 (Dec. 11, 2011), pp. 408-415, XP032113193.

Perkins, University of GLasgow M. Westerlund Ericsson J Ott Aalto University C: "Web Real-Time Communication (WebRTC): Media Transport and Use of RTP; draft-ietf-ftcweb-rtp-usage-03.txt", Web Real-Time Communication (WebRTC): Media Transport and Use of RTP; draft-ietf-ftcweb-rtp-usage-03.txt, Internet Engineering Task Force, IETF; StandardWorkingDraft, Internet Society (ISOC) 4, Rue Des Falaises CH-1205 Geneva, Switzerland, Jun. 5, 2012 (Jun. 5, 2012), pp. 1-61, XP015083160.

Dutton S, "Getting Started with WebRTC" HTML5 Rocks Tutorials, Jul. 23, 2012 (Jul. 23, 2012), XP002698553.

Burnett et al., "Getting Access to Local Devices that Can Generate Multimedia Streams", W3c, Dec. 22, 2011 (Dec. 22, 2011), XP002698554.

English translation of the Written Opinion dated Feb. 21, 2015 for corresponding International Application No. PCT/FR2013/051948, filed Aug. 19, 2013.

* cited by examiner

REMOTE ACCESS TO CONTENT FROM A THIN CLIENT

CROSS-REFERENCE TO RELATED APPLICATIONS

This Application is a Section 371 National Stage Application of International Application No. PCT/FR2013/051948, filed Aug. 19, 2013, which is incorporated by reference in its entirety and published as WO 2014/029944 on Feb. 27, 2014, not in English.

FIELD OF THE DISCLOSURE

The invention relates to remote access to content from a thin client, particularly an Internet browser, of a communication terminal. In particular, the invention will be implemented in the Internet browser framework using the language HTML 5.0

BACKGROUND OF THE DISCLOSURE

Remote access to content can be effected either via a specific application that will be downloaded onto a communication terminal of a client. This application allows the communication terminal on which it is implemented to dialogue with a content access provision platform. The drawback of such applications is that as many versions must be developed as there are operating systems in order for them to be compatible with the terminal downloading them. Furthermore, they occupy memory space on the terminal and generate computational costs on the latter.

A more generic option is to allow access to such content from a thin client such as an Internet browser. Today, access to such content from a thin client requires transcoding of the content to adapt it to the language used by the thin client or even to the communication protocol used to transmit it when the client can support the content. Thus, the content access provision platform requires at least transcoding means to adapt the content to the communication protocol and to the video uploading capabilities of the thin client at the receiving end, and the thin client must provide the access provision platform with the communication protocol and video uploading capability parameters that it uses.

SUMMARY

A subject of the invention is a method for accessing at least one content, executed by a device providing access to content of a communication network, from a thin client of a remote communication terminal, said access method including the reproduction of at least one content reproduction signal by said thin client, said reproduction signal received by the thin client during a communication session with said device for providing access to content being produced by an execution module of said device for providing access to content and relayed, without processing, by a decoy module of said device for providing access to content, said decoy module being registered with said device for providing access to content as a virtual reproduction peripheral.

Thus, the communication protocol used to transmit the content reproduction signal is known both on the access provision platform and on the communication terminal, since it is used for conventional audio/video communication sessions, namely telephony or visiophony via the thin client by the communication terminal. For example, it is the WebRTC developed to allow audio/video communications via HTML 5.0.

Furthermore, the registration of the decoy module relaying the reproduction signal as virtual reproduction peripheral allows the thin client of the terminal to receive the reproduction signal without transcoding since all this happens as if the decoy module was a local peripheral of a communication module establishing the communication session.

Advantageously, said at least one reproduction signal includes a video signal or an audio signal.

Thus, this method can be applied either to a video content or to an audio content, or to the video signal and the audio signal of a content in parallel.

Advantageously, according to one implementation of the invention, the various steps of the method according to the invention are implemented by a software or computer program, this software program comprising software instructions intended to be executed by a data processor of a device forming part of a thin client of a communication terminal, and being designed to control the execution of the various steps of this method.

The invention therefore also addresses a program comprising program code instructions for executing the steps of the access method when said program is executed by a processor.

This program can use any programming language and be in the form of source code, object code or intermediate code between source code and object code, such as in a partly compiled form or in any other desired form.

Another subject of the invention is a thin client of a remote communication terminal capable of being put into communication with at least one device for providing access to content, said thin client including means for reproducing at least one content reproduction signal, said reproduction signal received by the thin client during a communication session with said device for providing access to content being produced by an execution module of said device for providing access to content and relayed, without processing, by a decoy module of said device for providing access to content, said decoy module being registered with said device for providing access to content as a virtual reproduction peripheral.

Another subject of the invention is a remote communication terminal including a thin client capable of reproducing at least one content reproduction signal, said reproduction signal received by the thin client during a communication session with a device for providing access to content being produced by an execution module of said device for providing access to content and relayed, without processing, by a decoy module of said device for providing access to content, said decoy module being registered with said device for providing access to content as a virtual reproduction peripheral.

Yet another subject of the invention is a method for providing access to at least one content for a thin client of a communication terminal by way of a device for providing access to content of a communication network, said device for providing access to content executing said content, said access provision method including transmission to said thin client of at least one content reproduction signal during a communication session between said device for providing access to content and said thin client of said communication terminal, said reproduction signal being produced by an execution module of said device for providing access to content and relayed, without processing, by a decoy module of said device for providing access to content, said decoy module being registered with said device for providing access to content as a virtual reproduction peripheral.

Advantageously, the access provision method includes the provision of said thin client of the remote communication terminal with a list of the content to which said access provision device provides access for said thin client allowing the selection of at least one content by said thin client to request access to the selected content from said device for providing access to content.

Thus, using the request protocol of the thin client, the access provision device can, in response to a request to provide access to content, reply by sending back an Internet page with a list of content. The selection of a content from this list will trigger the sending by the thin client of a request to access the selected content by using the HTML 5.0 protocol for example.

Advantageously, the access provision method includes reception of a request to access a content of said device for providing access to content, said access request triggering the execution of said content by said execution module producing said reproduction signal.

Thus, it is the thin client that triggers the execution of the content by the access provision device. The thin client keeps control of the execution as if the content were executed locally while expelling the computing costs of the access provision device.

Advantageously, the access provision method includes the search for a peripheral for reproducing said reproduction signal produced by the execution module incorporating the decoy module in the reproduction chain.

Thus, by virtue of its registration as a virtual reproduction peripheral, the decoy module is selected to reproduction the content that is requested by a remote communication terminal.

Advantageously, said access provision method includes the incorporation of said decoy module into the reproduction chain of the reproduction signal produced by said execution module, said incorporation of the decoy module triggering establishment of said communication session between said thin client and said access provision device.

Thus, the decoy module can relay the reproduction signal by being considered as a virtual reproduction peripheral by the content execution module and as a local source peripheral by a communication module establishing the communication session.

Advantageously, according to one implementation of the invention, the various steps of the method according to the invention are implemented by a software or computer program, this software program comprising software instructions intended to be executed by a data processor of a device forming part of an access provision device and being designed to control the execution of the various steps of this method.

The invention therefore also addresses a program comprising program code instructions for executing the steps of the access provision method when said program is executed by a processor.

This program can use any programming language and be in the form of source code, object code or intermediate code, between source code and object code, such as in a partly compiled form or in any other desired form.

Method for installing a device for providing access to content, said access provision device being capable of establishing a communication session with a thin client of a communication terminal, said installation method including registration of a decoy module with said access provision device as a virtual reproduction peripheral, said decoy module being capable of relaying, without processing, a reproduction signal produced by an execution module of said access provision device to a thin client of a communication terminal during a communication session between said access provision device and said thin client.

Advantageously, according to an implementation of the invention, the various steps of the method according to the invention are implemented by a software or computer program, this software program comprising software instructions intended to be executed by a data processor of a device for providing access to content and being designed to control the execution of the various steps of this method.

The invention therefore also addresses a program comprising program code instructions for executing the steps of the installation method when said program is executed by a processor.

This program can use any programming language and be in the form of source code, object code or intermediate code, between source code and object code, such as in a partly compiled form or in any other desired form.

Another subject of the invention is a decoy module capable of relaying, without processing, reproduction signals including means for registering said decoy module with a device for providing access to content as a virtual reproduction peripheral.

A subject of the invention is a device for providing access to content including a module for executing at least one content producing at least one reproduction signal for said content and a decoy module registered as a virtual reproduction peripheral with said access provision device, said decoy module being capable of relaying said reproduction signal to a thin client of a communication terminal during a communication session between said thin client and said access provision device.

BRIEF DESCRIPTION OF THE DRAWINGS

The features and advantages of the invention will become more clearly apparent on reading the description, given by way of example, and the figures relating thereto, in which.

DETAILED DESCRIPTION OF ILLUSTRATIVE EMBODIMENTS

The invention makes it possible to broadcast content (audio, video, games) located in the home network of nomadic clients via a thin client incorporating a communication module, such as the HTML 5.0 browser incorporating a WebRTC API. The advantage for the client lies in the fact that he does not have to install any specific method or module onto his mobile communication terminal to have this access.

Figure 1:
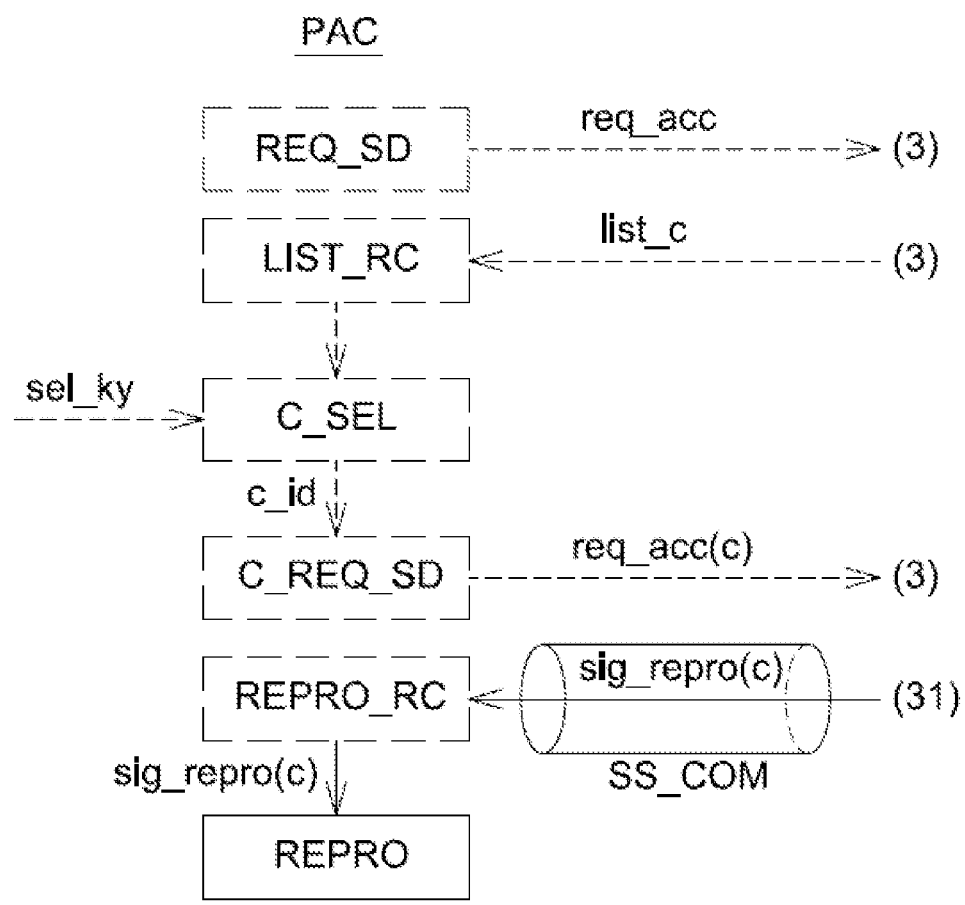
FIG. 1 represents a simplified diagram of an access method according to the invention.

FIG. 1 illustrates a simplified diagram of an access method PAC according to the invention. The method PAC for accessing at least one content makes it possible to access said content from a thin client (illustrated in FIG. 4, thin client 10) of a remote communication terminal (illustrated in FIG. 4, terminal 1) for said content C. Said content C accessed by the thin client 10 is executed by a device 3 for providing access to the content of a communication network (illustrated in FIG. 4, network 2). The access method PAC includes reproduction REPRO by said thin client 10 of at least one content reproduction signal sig_repro (c). The reproduction signal sig_repro (c) received REPRO_RC by the thin client 10 during a communication session SS_COM with said device 3 for providing access to content is produced by an execution module (illustrated in FIG. 4, module 30) of said device 3 for providing access to content and relayed, without processing, by a decoy module (illustrated in FIG. 4, module 31) of said device 3 for providing access to content, said decoy module 31 being registered with said device 3 for providing access to content as a virtual reproduction peripheral.

In particular, the reproduction signal includes a video signal or an audio signal. Thus, this method can be applied either to a video content or to an audio content, or to the video signal and the audio signal of a content in parallel.

In particular, the access method includes transmission C_REQ_SD of a request req_acc(c) to access a predetermined content C to the device 3 for providing access to content.

In particular, the content C that is the subject of the access request req_acc(c) can be predetermined as a function of an identified content c_id during a selection C_SEL either by the thin client 10 or by the communication terminal 1, or by an input sel_ky from the user of the communication terminal 1.

In particular, this selection C_SEL can be made by free input of a title or an identifier of a desired content by choosing a content from a content list. One or more content lists are present in the thin client 10 (notably in its cache or cookies area) and/or in the communication terminal 1 and/or provided by the device 3 for providing access to content.

In particular, the access method PAC includes reception LIST_RC of a content list list_c provided by the device 3 for providing access to content.

In particular, the access method PAC includes transmission REQ_SD of an access request req_acc to an access provision device 3 triggering either the provision of a content list list_c by the access provision device 3 for the thin client 10 and therefore the step of receiving LIST_RC this list from the access method PAC, or the transmission of a content reproduction signal sig_repro(c) by the access provision device 3 and the reproduction step REPRO of the access method PAC.

In particular, according to an implementation of the invention, the various steps of the access method according to the invention are implemented by a software or computer program, this software program comprising software instructions intended to be executed by a data processor of a device forming part of a thin client of a communication terminal, and being designed to control the execution of the various steps of this method.

Figure 2:
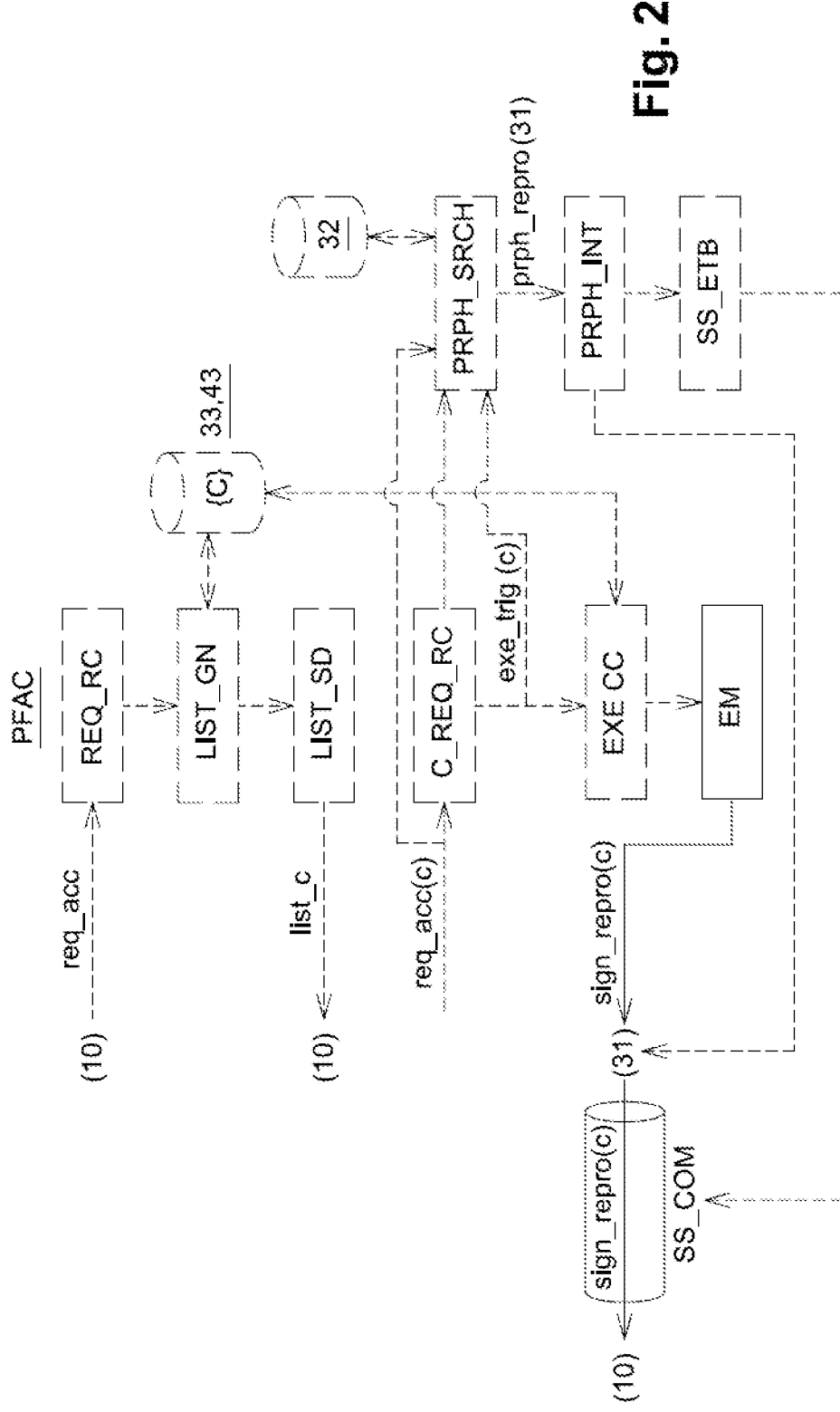
FIG. 2 represents a simplified diagram of an access provision method according to the invention.

FIG. 2 illustrates a simplified diagram of an access provision method PFAC according to the invention.

Figure 4:
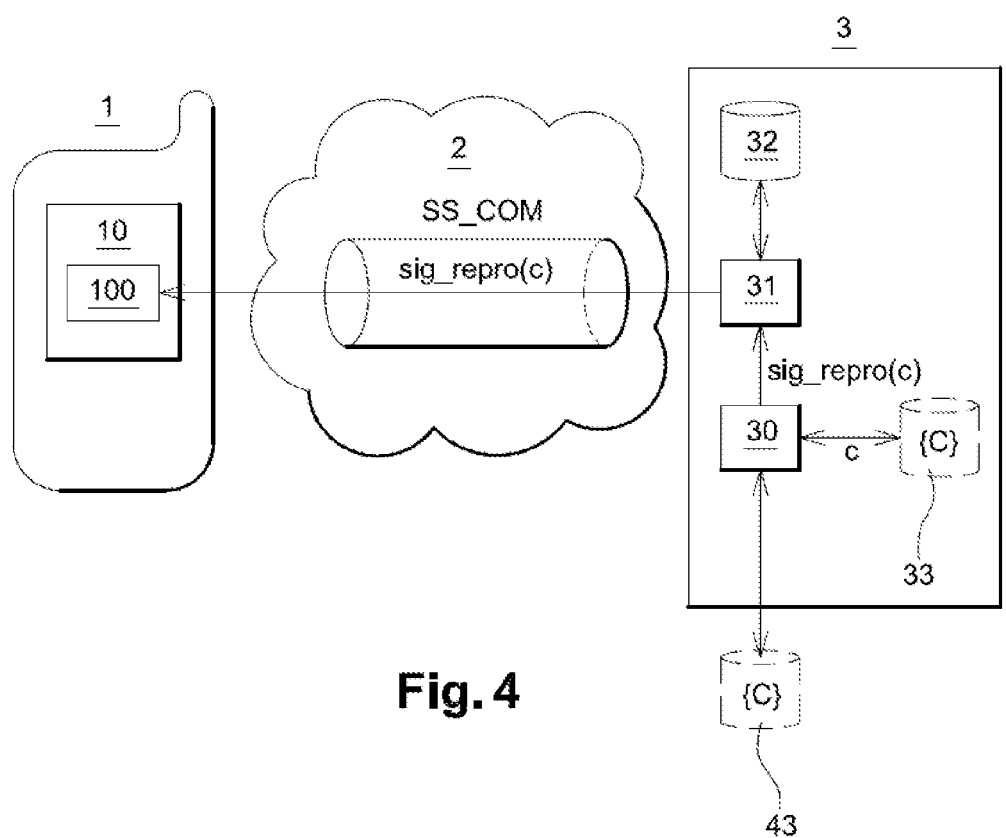
FIG. 4 represents a communication architecture implementing the invention.

The access provision method PFAC allows a device for providing access to content (illustrated in FIG. 4, access provision device 3) of a communication network (illustrated in FIG. 4, network 2) to provide access to at least one content for a thin client (illustrated in FIG. 4, thin client 10) of a communication terminal (illustrated in FIG. 4, terminal 1). The device 3 for providing access to content executes said content. The access provision method PFAC includes transmission EM to said thin client 10 of at least one content reproduction signal sig_repro(c) during a communication session SS_COM between said device 3 for providing access to content and said thin client 10 of said communication terminal 1. The reproduction signal sig_repro(c) is produced by an execution module (illustrated in FIG. 4, module 30) of said device 3 for providing access to content and relayed, without processing, by a decoy module (illustrated in FIG. 4, module 31) of said device 3 for providing access to content. The decoy module 31 is registered with said device 3 for providing access to content as a virtual reproduction peripheral.

In particular, the reproduction signal includes a video signal or an audio signal. Thus, this method can be applied either to a video content or to an audio content, or to the video signal and the audio signal of a content in parallel specifically by using two decoy modules: one for the video, the other for the audio.

In particular, the access provision method PFAC includes reception C_REQ_RC of a content access request req_acc (c). The access request req_acc(c) triggers execution EXE (C) of said content by the execution module 30 producing said reproduction signal sig-repro(c). The execution of the content EXE(C) is notably a step of the access provision method PFAC.

In particular, the access provision method PFAC includes provision LIST_SD of said thin client 10 of the remote communication terminal 1 with a list list_c of the content to which said access provision device 3 provides access for the thin client 10. This list list_c allows the selection of at least one content C by said thin client 10 to request access to the selected content from req_acc(c) said device 3 for providing access to content.

In particular, the access provision method PFAC includes reception REQ_RC of an access request req_acc of a thin client 10 triggering either the step of providing a content list list_c of the access provision method PFAC or the step of transmission of a content reproduction signal sig_repro(c) of the access provision method PFAC.

In particular, the content list list_c provided is notably generated in a step of generating content lists LIST_GN of the access provision method on the basis of one or more existing lists of content available on the access provision device 3 or of content accessible by the content provision device 3 and/or on the basis of one or more content databases 33 of the access provision device 3 or database 43 that are accessible by the access provision device 3.

In particular, the access provision method PFAC includes establishment SS_ETB of a communication session SS_COM during which the content reproduction signal sig_repro(c) is transmitted to the thin client via the decoy module 31 of the access provision device 3.

The establishment of the communication session SS_ETB is triggered directly or indirectly either by the content access request req_acc(c) originating from a thin client 10 or by the receiving of this access request C_REQ_RC, or by the triggering of the execution of the content exe_trig(c), or at the start of the execution EXE(C) of the content. Notably, when the user of a communication terminal 1 clicks on the "play" button of an HTML 5.0 page on the thin client 10 side (browser of the user), this triggers the establishment of the session SS_ETB by the access provision device 3.

In particular, the access provision method PFAC includes the search PRPH_SRCH for a peripheral for reproducing said reproduction signal sig_repro(c) produced by the execution module 30. The search PRPH_SRCH makes it possible to incorporate the decoy module 31 into the reproduction chain notably by providing an identifier prph_repro(31) of the decoy module 31 as a result of the search. The access provision method PFAC searches for a peripheral, notably in a register of peripherals 32 of the access provision device 3 with which the decoy module 31 will have registered beforehand (not illustrated) as a virtual reproduction peripheral.

In particular, said access provision method includes the incorporation PRPH_INT of said decoy module 31 into the reproduction chain of the reproduction signal sig_repro(c) produced by said execution module 30. The incorporation PRPH_INT of the decoy module triggers the establishment SS_ETB of said communication session SS_COM between said thin client 10 and said access provision device 3.

In particular, according to an implementation of the invention, the various steps of the access provision method according to the invention are implemented by a software or computer program, this software program comprising software instructions intended to be executed by a data processor of a device forming part of an access provision device and being designed to control the execution of the various steps of this method.

Figure 3:
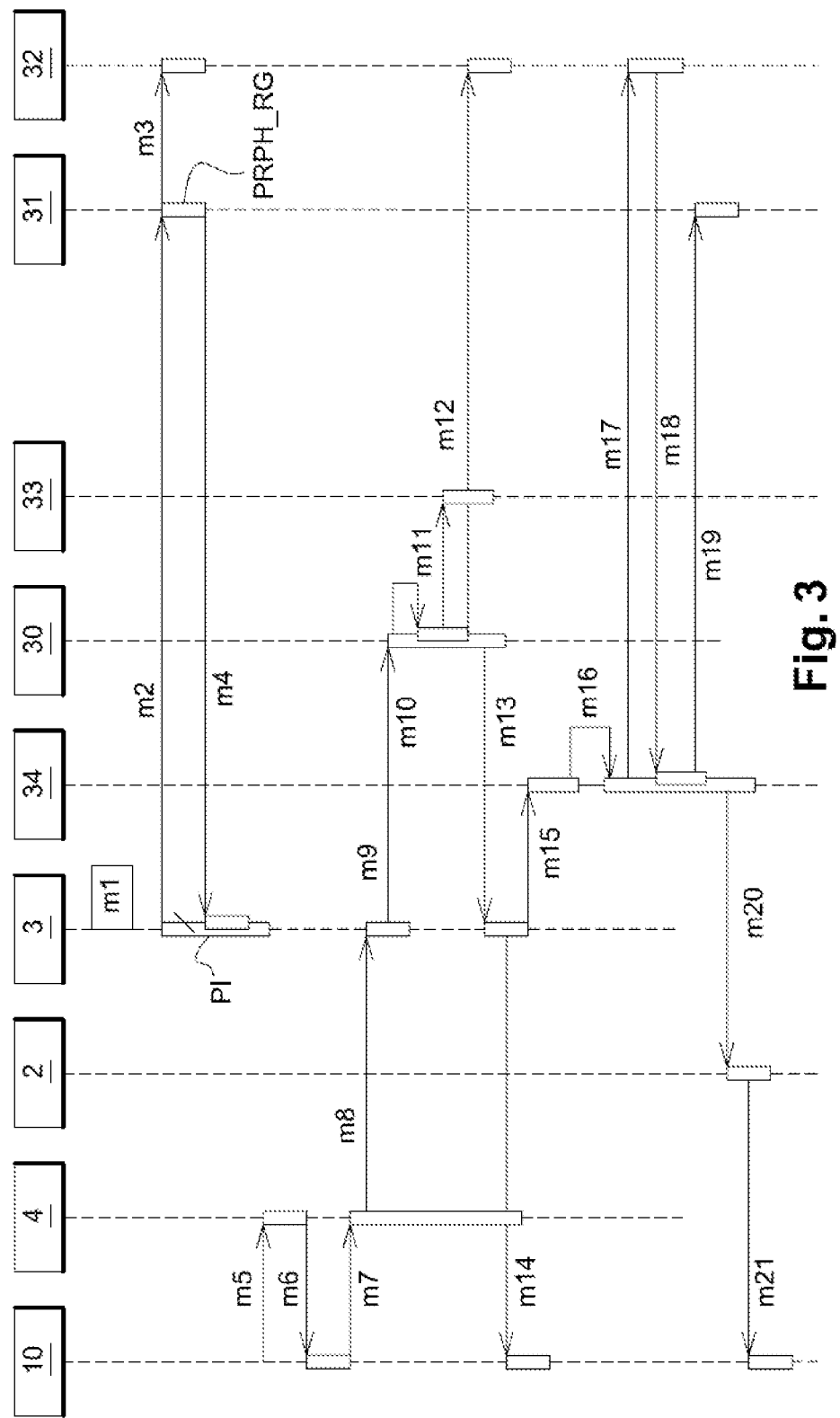
FIG. 3 represents a diagram of the exchanges during the implementation of the methods according to the invention.

FIG. 3 illustrates a diagram of the exchanges during the implementation of the access PAC and access provision PFAC methods by the thin client 10 and the access provision device 3 respectively, according to the invention. By way of example, the thin client 10 illustrated by FIG. 3 is a remote web client using in particular the HTML 5.0 request protocol and the communication protocol on HTML 5.0 WebRTC.

FIG. 3 furthermore illustrates an installation method PI including registration PRPH_RG of a decoy module 31, also known as ScreenCapturer in the case of a video signal, in a register of peripherals 32 of the access provision device 3.

In particular, the installation method PI includes the receiving of a start command m1: Start( ) for the installation method PI (the Start( ) message is a start message according to the HTML 5.0 protocol). The installation method PI triggers m2: LaunchModule( ) the registration PRPH_REG of the decoy module 31.

In particular, the successful registration of the decoy module 31 is the subject of a message m4: OK making it possible to complete or even close the installation method PI.

Thus, in an access request by a thin client 10 for a content made available by the access provision device 3, the decoy module 31 will be automatically put into the reproduction chain by virtue of its being registered as a virtual reproduction peripheral.

In the example illustrated in FIG. 3, the device for providing access to content is broken down into two separate devices: a service provision device 4 and the access provision device 3 itself, such as a WebSocket server. The latter (the access provision device 3 itself) is composed in the example in FIG. 3 not only of the execution module 30, the decoy module 31, the peripheral register 32 and the content base 33, but also particularly of a communication module 34 (in this case a WebRTC proxy).

The user of a remote communication terminal 1 (not illustrated in FIG. 3) such as a smartphone, a portable computer connected to a wired or non-wired communication network (such as a mobile network (3G, 4G, etc.) or WiFi network, etc.) including a thin client 10, wishes to access, from his remote communication terminal, a content available either on another communication terminal, particularly at his home or at the homes of his friends or family (content sharing), or on a remote server (particularly in the context of "cloud" computing, i.e. of execution by communication network equipment).

Let us consider the example of a player who wishes to access a game on a remote server 3: the server 3 executes the game in order to reduce the computing costs for the client terminal. The game is therefore executed in the "cloud": the term cloud gaming is also used.

The thin client 10 sends an access request for the content access service m5: getService( ) either directly to the access provision device 3 or to a service provision device 4 such as a ServerWebPortal (as illustrated in FIG. 3). In response to this request m5, the thin client receives a message, particularly including a list of the content available, particularly in the form of an HTML page such as m6: ok:parameter pageHTML( ). This list m6 allows the thin client to request access to a predetermined game particularly by providing parameters of the game such as the name of the game, the identifier of the user of the terminal as client of the game . . . m7: getJeu:parameter NomJeu, IDClient( ).

The access provision device 3 receives this game access request m8: getJeu:parameter NomJeu, IDClient( ), optionally relayed by a service provision device 4, triggers m9: getJeu:parameter NomJeu, IDClient( ) the execution of the game by an execution module 30 also known in our example as the GameManager.

The execution module 30 seeks the location of the game to which access is requested m10: getEmplacement:parameter NomJeu( ) then executes the game m11: lancerJeu( ) by reading the game in the content database 33.

The start of the execution of the game triggers the entry of the game into the register 32 of the peripherals of the access provision device and the sending of a message of confirmation of the start of the game m13: ok( ) by the execution module 30. Thus, the access provision device 3 being informed of the start of the game m13: ok( ) uses the HTML 5.0 protocol to send the thin client 10 information concerning the reproduction, video in this case, of the game m14: OK:parameter:taille, emplacement visuel sur le serveur ( ). In parallel, the access provision device 3 triggers the transmission m15: launchStreaming(,) particularly in the communication module 34, allowing the establishment of the WebRTC communication session between the access provision device 3 and the thin client 10 m20: getPeerConnection( ) m21: setPeerconnection( ) (in particular via a PeerConnectionServer).

The triggering of the transmission m15 controls m16: getUserMedia( ) the search for a reproduction peripheral, video in this case m17: getPeripherique( ) in the register 32. The register 32 provides m18: Peripherique: screencapturer( ) notably an identifier of the decoy module 31 as a peripheral suitable for this reproduction chain involving a remote thin client 10.

The access provision device 3 or even, as illustrated in FIG. 3, the communication module 34 of the access provision device 3 controls m19: Peripherique integre( ) incorporation of the decoy module thus identified into the reproduction chain.

Thus, the reproduction signal (not illustrated in FIG. 3), video in this case, produced by the execution module 33 during the execution of the game will be transmitted by the execution module 33 to the decoy module 31 that the execution module takes for a reproduction peripheral by virtue of it being registered as such in the peripheral register 32.

The decoy module 30 receiving the reproduction signal relays it via the communication session, in this case WebRTC, to the thin client 10, which sees the decoy module 31 as a local peripheral of the thin client 10, in this case a camera.

In the case of the game, it is notably envisioned to incorporate several decoy modules (not illustrated): for example, one by reproduction signal produced during the execution of the content, in this case the game: one video decoy module for the video signal and one audio decoy module for the audio signal. Both signals can be transmitted in one and the same communication session or in separate communication sessions.

FIG. 4 illustrates a communication architecture implementing the invention.

The architecture includes a remote communication terminal 1 including a thin client 10 capable of reproducing at least one content reproduction signal sig_repro(c). The reproduction signal sig_repro(c) is received by the thin client 10 during a communication session SS_COM with a device 3 for providing access to content. The reproduction signal sig_repro(c) is produced by an execution module 30 of said device 3 for providing access to content and relayed, without processing, by a decoy module 31 of said device 3 for providing access to content. The decoy module 31 is registered with said device 3 for providing access to content as a virtual reproduction peripheral.

In particular, the thin client 10 includes means 100 for reproducing at least one content reproduction signal sig_repro(c).

The architecture includes a device 3 for providing access to content including a module 30 for executing at least one content producing at least one content reproduction signal sig_repro(c) and a decoy module 31 registered as a virtual reproduction peripheral with said access provision device 3.

The decoy module 31 is capable of relaying reproduction signals without processing. It includes means (not illustrated) for registering said decoy module 31 with a device 3 for providing access to content as a virtual reproduction peripheral. The access provision device 3 includes, in particular, a register of peripherals with which the decoy module 31 is registered as a virtual reproduction peripheral for remote access requests from a thin client.

In particular, the execution module 30 executes a content either of a database of content 43 accessible by the access provision device 3 or of a database of content 33 of the access provision device 3.

The access provision device 3, notably a media server, is connected to a communication module (such as the module 34 illustrated by FIG. 3), notably a WebRTC hub on the home network. This access provision device 3 is seen by the communication module as a local USB webcam.

The access provision device 3 provides, notably, the list of audio and video content for the communication module. This list is, in particular, incorporated into an HTML component in such a way that the user can, from anywhere and any communication terminal, reproduce the chosen content.

For content of game type, a module notably using Microsoftdirectshow API allowing the game to be executed is seen by the communication module 34 as a local USB webcam.

This solution allows the communication module to transmit the content without transcoding.

The invention also addresses storage media. The information storage medium can be any entity or device capable of storing a program according to the invention. For example, the storage medium can include a storage means, such as a ROM, for example a CD ROM or a ROM of a microelectronic circuit or else a magnetic recording means, for example a floppy disk or a hard disk.

Moreover, the information storage medium can be a transmissible storage medium such as an electrical or optical signal that can be conveyed via an electrical or optical wire, by radio or by other means. The program according to the invention can in particular be downloaded onto a network, notably of Internet type.

Alternatively, the information storage medium can be an integrated circuit in which the program is incorporated, the circuit being suitable for executing or for being used in the execution of the method in question.

In another implementation, the invention is implemented by means of software and/or hardware components. With this in mind the term module can correspond just as well to a software component as to a hardware component. A software component corresponds to one or more computer programs, one or more sub-programs of a program, or more generally to any element of a program or of a software package capable of implementing a function or a set of functions according to the description below. A hardware component corresponds to any element of a hardware assembly capable of implementing a function or a set of functions.

The invention claimed is:

1. A method for accessing at least one content from a thin client of a remote communication terminal, said content being executed by a device for providing access to content of a communication network, said method comprising the following acts:
   transmitting over the communication network, from the thin client to the device for providing access to content, a request to access the content;
   in response to the act of transmitting, receiving over the communication network at least one content reproduction signal by said thin client from a decoy module of said device for providing access to content,
      said reproduction signal being received by the thin client of the remote communication terminal during a communication session with said device for providing access to content,
      wherein the at least one content reproduction signal comprises at least one of a video signal or an audio signal produced by an execution module of said device for providing access to content upon execution of the content, and
      wherein the at least one content reproduction signal is provided by the execution module to be reproduced by the decoy module acting as a reproduction peripheral and being relayed, without processing, by the decoy module of said device for providing access to content, said decoy module being registered as a virtual reproduction peripheral with said device for providing access to content in a registration database of said device for providing access to content; and
   reproducing the at least one content reproduction signal by said thin client.

2. A non-transitory computer-readable medium comprising a computer program stored thereon, which includes program code instructions for executing a method for accessing at least one content from a thin client of a remote communication terminal, when said program is executed by a processor of the communication terminal, said content being executed by a device for providing access to content of a communication network, wherein the method comprises the following acts:
   transmitting over the communication network, from the thin client to the device for providing access to content, a request to access the content;
   in response to the act of transmitting, receiving over the communication network at least one content reproduction signal by said thin client from a decoy module of said device for providing access to content, said reproduction signal received by the thin client of the remote communication terminal during a communication session with said device for providing access to content, wherein the at least one content reproduction signal comprises at least one of a video signal or an audio signal produced by an execution module of said device for providing access to content upon execution of the requested content, and wherein the at least one content reproduction signal is provided by the execution module to be reproduced by the decoy module acting as a reproduction peripheral and being relayed, without processing, by the decoy module of said device for providing access to content, said decoy module being registered as a virtual reproduction peripheral with said device for providing access to content in a registration database of said device for providing access to content; and reproducing the at least one content reproduction signal by said thin client.

3. A thin client device of a remote communication terminal capable of being put into communication a device for providing access to content, said thin client including:

a processor; and a non-transitory computer-readable storage medium storing instructions, which configure the processor to perform acts comprising:

transmitting over the communication network, from the thin client device to the device for providing access to content, a request to access the content;

in response to the act of transmitting, receiving over the communication network at least one content reproduction signal by said thin client device from a decoy module of said device for providing access to content, said reproduction signal being received by the thin client device during a communication session with said device for providing access to content, wherein the at least one content reproduction signal comprises at least one of a video signal or an audio signal produced by an execution module of said device for providing access to content upon execution of the content, and wherein the at least one content reproduction signal is provided by the execution module to be reproduced by the decoy module acting as a reproduction peripheral and being relayed, without processing, by the decoy module of said device for providing access to content, said decoy module being registered as a virtual reproduction peripheral with said device for providing access to content in a registration database of said device for providing access to content; and reproducing the at least one content reproduction signal by said thin client device.

4. A remote communication terminal comprising:

a processor;

a non-transitory computer-readable storage medium; and a thin client stored on the storage medium and configuring the processor to perform acts comprising:

transmitting over the communication network, from the thin client to the device for providing access to content, a request to access the content;

in response to the act of transmitting, receiving over the communication network at least one content reproduction signal by said thin client from a decoy module of said device for providing access to content, said reproduction signal being received by the thin client of the remote communication terminal during a communication session with said device for providing access to content, wherein the at least one content reproduction signal comprises at least one of a video signal or an audio signal produced by an execution module of said device for providing access to content upon execution of the content, and wherein the at least one content reproduction signal is provided by the execution module to be reproduced by the decoy module acting as a reproduction peripheral and being relayed, without processing, by the decoy module of said device for providing access to content, said decoy module being registered as a virtual reproduction peripheral with said device for providing access to content in a registration database of said device for providing access to content; and reproducing the at least one content reproduction signal by said thin client.

5. A method for providing access to at least one content for a thin client of a communication terminal by a device for providing access to content of a communication network, the method comprising the following acts performed by the device for providing access to content:

receiving over the communication network, from the thin client, a request to access the content;

in response to receiving the request to access the content, identifying a decoy module of the device for providing access to the content and inserting the decoy module in a reproduction chain involving the thin client, wherein the decoy module is registered as a virtual reproduction peripheral with said device for providing access to the content in a registration database of said device for providing access to the content, executing the requested content by an execution module of said device for providing access to the content, to produce a reproduction signal comprising at least one of a video signal or an audio signal;

providing the at least one content reproduction signal by the execution module to the decoy module to be reproduced by the decoy module acting as the virtual reproduction peripheral; and relaying the reproduction signal to the thin client over the communication network, without processing, by the decoy module of said device for providing access to content, during a communication session between said device for providing access to the content and said thin client of said communication terminal.

6. The method as claimed in claim 5, wherein the method includes:

providing said thin client of the remote communication terminal with a list of the content to which said device provides access to said thin client allowing selection of at least one content by said thin client to request access to the selected content from said device for providing access to content.

7. The method as claimed in claim 5, wherein said act of receiving the request to access the content triggers the act of executing said requested content by said execution module, which produces said reproduction signal.

8. The method as claimed in claim 5, wherein said act of identifying the decoy module comprises searching in the registration database for a peripheral for reproducing said reproduction signal produced by the execution module, wherein searching identifies the decoy module.

9. The method as claimed in claim 5, wherein said act of inserting said decoy module into the reproduction chain of the reproduction signal produced by said execution module triggers establishment of said communication session between said thin client and said device for providing access.

10. A non-transitory computer-readable medium comprising a computer program stored thereon, which includes program code instructions for executing a method for providing access to at least one content for a thin client of a communication terminal by a device for providing access to content of a communication network, when said program is executed by a processor of the device, wherein the method comprises the following acts performed by the device for providing access to content:
receiving over the communication network, from the thin client, a request to access the content;
in response to receiving the request to access the content, identifying a decoy module of the device for providing access to the content and inserting the decoy module in a reproduction chain involving the thin client, wherein the decoy module is registered as a virtual reproduction peripheral with said device for providing access to the content in a registration database of said device for providing access to the content,
executing the requested content by an execution module of said device for providing access to the content, to produce a reproduction signal comprising at least one of a video signal or an audio signal;
providing the at least one content reproduction signal by the execution module to the decoy module to be reproduced by the decoy module acting as the virtual reproduction peripheral; and
relaying the reproduction signal to the thin client over the communication network, without processing, by the decoy module of said device for providing access to content, during a communication session between said device for providing access to the content and said thin client of said communication terminal.

11. A method for installing a device for providing access to content, said access provision device being capable of establishing a communication session with a thin client of a communication terminal, said method for installing including the following acts performed by the device for providing access to content:
storing a decoy module in a non-transitory computer-readable medium of the device for providing access to content; and
registering the decoy module as a virtual reproduction peripheral in a registration database of said device for providing access to content, said decoy module being configured to relay, without processing, a reproduction signal produced by execution of requested content by an execution module of said device for providing access to a thin client of a communication terminal during a communication session between said device for providing access and said thin client, the reproduction signal comprising at least one of a video signal or an audio signal, and the execution module being configured to provide the at least one content reproduction signal to the decoy module to be reproduced by the decoy module acting as the virtual reproduction peripheral.

12. A non-transitory computer-readable medium comprising a computer program stored thereon, which includes program comprising program code instructions for executing a method of installing a device for providing access to content, when said program is executed by a processor, said device for providing access to content being capable of establishing a communication session with a thin client of a communication terminal, the method comprising the following acts performed by the device for providing access to content:
storing a decoy module in a non-transitory computer-readable medium of the device for providing access to content; and
registering the decoy module as a virtual reproduction peripheral in a registration database of said device for providing access to content, said decoy module being configured to relay, without processing, a reproduction signal produced by execution of requested content by an execution module of said device for providing access to a thin client of a communication terminal during a communication session between said device for providing access and said thin client, the reproduction signal comprising at least one of a video signal or an audio signal, and the execution module being configured to provide the at least one content reproduction signal to the decoy module to be reproduced by the decoy module acting as the virtual reproduction peripheral.

13. An apparatus comprising:
at least one non-transitory computer-readable storage medium;
a registration database stored in the at least one non-transitory computer-readable storage medium;
an execution module stored in the at least one non-transitory computer-readable storage medium, which is configured to execute content;
a decoy module stored in the at least one non-transitory computer-readable storage medium and being registered in the registration database as a virtual reproduction peripheral of a device for providing access to content, said decoy module being configured to receive a reproduction signal from the execution module of the device, which is produced by executing content requested by a thin client of a communication terminal, and relay the reproduction signal to the thin client during a communication session between said thin client and said device, wherein the reproduction signal comprises at least one of a video signal or an audio signal, and the execution module being configured to provide the at least one content reproduction signal to the decoy module to be reproduced by the decoy module acting as the virtual reproduction peripheral; and
a processor configured to execute the execution module and the decoy module.

14. A device for providing access to content including:
at least one non-transitory computer-readable storage medium;
an execution module stored in the at least one non-transitory computer-readable storage medium and configured to execute requested content to produce at least one reproduction signal comprising at least one of a video signal or an audio signal; and
a decoy module stored in the at least one non-transitory computer-readable storage medium and being registered in a registration database as a virtual reproduction peripheral with said device, said decoy module being configured to relay said at least one reproduction signal to a thin client of a communication terminal during a communication session between said thin client and said device; and a processor configured by instructions, which when executed by the processor, configure the device for providing access to content to implement acts comprising:

receiving over a communication network, from the thin client, a request to access the content;

in response to receiving the request to access the content, identifying the decoy module from the registration database and inserting the decoy module in a reproduction chain involving the thin client, executing the requested content by the execution module of said device for providing access to the content, to produce the reproduction signal;

providing the at least one content reproduction signal by the execution module to the decoy module to be reproduced by the decoy module acting as the virtual reproduction peripheral; and relaying the reproduction signal to the thin client over the communication network, without processing, by the decoy module of said device for providing access to content, during the communication session between said device for providing access to the content and said thin client of said communication terminal.

* * * * *